(12) United States Patent
Williams et al.

(10) Patent No.: US 9,697,146 B2
(45) Date of Patent: Jul. 4, 2017

(54) RESOURCE MANAGEMENT FOR NORTHBRIDGE USING TOKENS

(71) Applicant: Advanced Micro Devices, Inc., Sunnyvale, CA (US)

(72) Inventors: Douglas R. Williams, Mountain View, CA (US); Vydhyanathan Kalyanasundharam, San Jose, CA (US); Marius Evers, Sunnyvale, CA (US); Michael K. Fertig, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 162 days.

(21) Appl. No.: 13/727,808

(22) Filed: Dec. 27, 2012

(65) Prior Publication Data

US 2014/0189700 A1 Jul. 3, 2014

(51) Int. Cl.
*G06F 12/00* (2006.01)
*G06F 13/16* (2006.01)
*G06F 13/40* (2006.01)

(52) U.S. Cl.
CPC ...... *G06F 13/1642* (2013.01); *G06F 13/4027* (2013.01)

(58) Field of Classification Search
CPC .......... G06F 13/00; G06F 13/14; G06F 13/16; G06F 13/1605; G06F 13/1642
See application file for complete search history.

(56) References Cited

U.S. PATENT DOCUMENTS

| | | | |
|---|---|---|---|
| 7,249,210 B2* | 7/2007 | Ganasan et al. | 710/117 |
| 2007/0294447 A1* | 12/2007 | Nozaki et al. | 710/240 |
| 2008/0112313 A1* | 5/2008 | Terakawa | 370/229 |
| 2010/0306483 A1* | 12/2010 | Buick et al. | 711/156 |
| 2012/0278583 A1* | 11/2012 | Woo et al. | 711/169 |
| 2013/0173849 A1* | 7/2013 | Balakrishnan | G06F 3/0613 711/103 |

* cited by examiner

*Primary Examiner* — Daniel Tsui

(57) ABSTRACT

A processor uses a token scheme to govern the maximum number of memory access requests each of a set of processor cores can have pending at a northbridge of the processor. To implement the scheme, the northbridge issues a minimum number of tokens to each of the processor cores and keeps a number of tokens in reserve. In response to determining that a given processor core is generating a high level of memory access activity the northbridge issues some of the reserve tokens to the processor core. The processor core returns the reserve tokens to the northbridge in response to determining that it is not likely to continue to generate the high number of memory access requests, so that the reserve tokens are available to issue to another processor core.

11 Claims, 4 Drawing Sheets

RESOURCE MANAGEMENT FOR NORTHBRIDGE USING TOKENS

FIELD OF THE DISCLOSURE

The present disclosure relates to resource management in processors.

BACKGROUND

Some processors employ a northbridge to facilitate communication between one or more processor cores, memory, southbridges, and other input/output components. The processors generate communication traffic in the form of memory access requests that retrieve data from and store data at the memory. The northbridge is interposed between the memory and the processor cores, and manages the communication traffic to prevent collisions and other potential traffic hazards. Offloading the management of the communication traffic to the northbridge reduces overhead at the processor cores, increasing processing efficiency. However, the resources of the northbridge can be taxed by some communication traffic patterns, such as bursts of memory access requests from a single processing core, thereby reducing overall memory access throughput.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-5 illustrate techniques for using tokens to manage resources at a northbridge of a processor to account for changes in memory access activity at a set of processor cores of the processor, thereby improving memory access speed for some memory access patterns. The northbridge uses a token scheme to govern the maximum number of memory access requests each of the processor cores can have pending at the northbridge. To implement the scheme, the northbridge initially issues a minimum number of tokens to each of the processor cores and keeps a number of tokens in reserve. In response to determining that a given processor core is generating a high level of memory access activity (e.g. by determining the processor core has issued a threshold number of memory access requests in a specified amount of time) the northbridge issues some of the reserve tokens to the processor core. The processor core returns the reserve tokens to the northbridge in response to determining that it is not likely to continue to generate the high number of memory access requests, so that the reserve tokens are available to issue to another processor core. Thus, the token scheme allows the northbridge to temporarily and dynamically provide additional resources to a processor core that is experiencing a temporarily high level of memory access activity.

Figure 1:
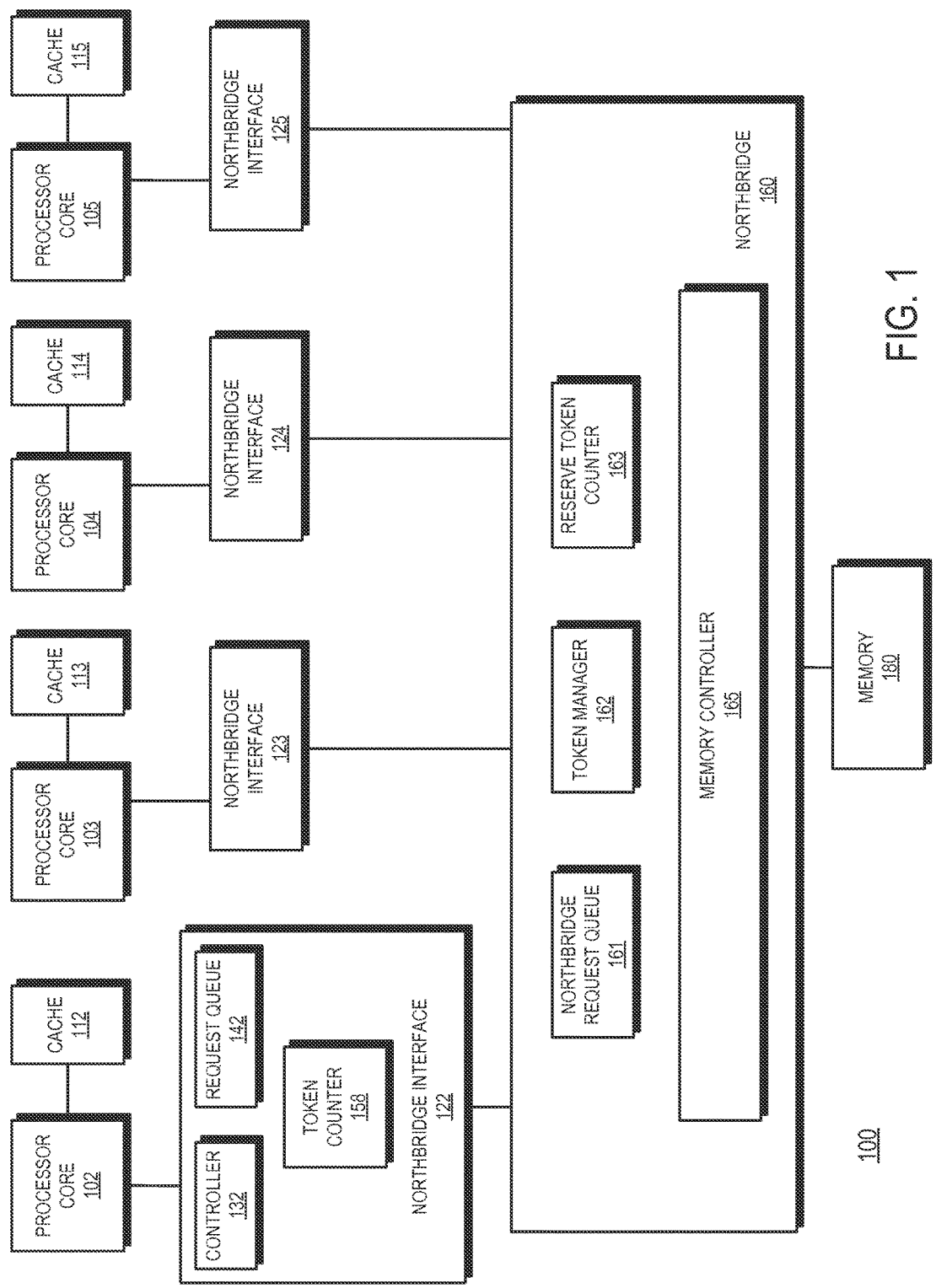
FIG. 1 is a block diagram of a processing system in accordance with some embodiments.

FIG. 1 illustrates a block diagram of a processing system 100 in accordance with some embodiments. The processing system 100 executes the instructions of computer programs in order to carry out tasks for an electronic device, such as a personal computer, tablet computer, server, cell phone or other telephone device, game console, and the like. To facilitate the execution of the instructions, the processing system 100 includes processor cores 102, 103, 104, and 105, caches 112, 113, 114, and 115, a northbridge 160, northbridge interfaces 122, 123, 124, and 125, and a memory 180. In some embodiments the processor cores 102-105, caches 112-115, and northbridge 160 are incorporated in the same integrated circuit die, while the memory 180 is incorporated in a different integrated circuit die. In some embodiments, the processing system 100 includes additional components (not shown) to facilitate the execution of instructions, such as one or more graphics processing units (GPUs) and a southbridge (e.g. an input/output controller hub or fusion controller hub) to manage communications with input/output interfaces, such as universal serial bus (USB) interfaces, Peripheral Component Interconnect-express (PCI-E) interfaces, and the like, and with interrupt controllers and other system components.

The memory 180 can be random access memory (RAM), flash memory, one or more disc or optical drives, and the like, or any combination thereof. The memory 180 stores, in the form of computer programs, the sets of instructions to be executed at the processing system 100, and also stores other information that is to be manipulated by execution of the instructions. The memory 180 is configured to store data (instructions or other information) and retrieve stored data in response to received requests, referred to as memory access requests. In particular, the memory 180 includes a set of memory locations, whereby each memory location is associated with a corresponding memory address. In response to receiving a memory access request to store data (a store request) the memory 180 stores the data at the memory location indicated by an address of the store request. Similarly, in response to receiving a memory access request to retrieve data (a load request) the memory 180 provides the data at the memory location indicated by an address of the load request.

The processor cores 102-105 are each configured to execute corresponding sets of instructions. To illustrate, in some embodiments, the computer programs to be executed at the processing system 100 are logically divided into subsets, referred to as threads. An operating system (OS) of the processing system 100, based on conditions of the processing system 100, schedules each thread for execution at a corresponding one of the processor cores 102-105. Each of the processor cores 102-105 includes a corresponding instruction pipeline that fetches instructions of its corresponding scheduled thread, decodes the instructions, dispatches the decoded instructions to corresponding execution units, and executes the decoded instructions.

In the course of executing the instructions of the threads, the processor cores 102-105 generate memory access requests. The processing system 100 implements a caching structure whereby each of the processor cores 102-105 attempts to satisfy a memory access request at a memory hierarchy including its corresponding cache. In particular, to satisfy a memory access request a processor core checks it corresponding cache to determine if the cache stores data associated with the memory address of the memory access request. If the cache does store the data (a cache hit), the memory access request is satisfied at the cache. If the cache does not store the data (a cache miss), the processor core provides the memory access request to its corresponding northbridge interface. Accordingly, processor cores 102, 103, 104, and 105 respectively provide memory access requests to northbridge interfaces 122, 123, 124, and 125.

The northbridge interfaces 122-125 facilitate communication of memory access requests to the northbridge 160 by storing memory access requests of the corresponding processor core at a request queue. Thus, in the illustrated example of FIG. 1, northbridge interface 122 includes a request queue 142 that stores memory access requests for the processor core 102. A controller 132 of the northbridge interface 122 manages provision of the memory access requests to the northbridge 122 as described further herein. The northbridge interfaces 123-125 are similarly configured. It will be appreciated that although the northbridge interfaces 123-125 are illustrated as separate from the processor cores 102-105, in some embodiments the northbridge interfaces 123-125 are incorporated into their corresponding processor core.

The northbridge 160 manages the communication of memory access requests, and their corresponding responses, between the northbridge interfaces 122-125 and the memory 180. For example, the northbridge 160 ensures that memory access requests generated at different processor cores are not simultaneously communicated to the memory 180, and ensures that a response to a memory access request, such as data responsive to a load request, is communicated to the processor core that generated the memory access request. In some embodiments the northbridge 160 also can manage communications between the northbridge interfaces 122-125 and other system components (not shown), such as one or more GPUs, a southbridge, and the like.

To manage the communication of the memory access requests, the northbridge 160 includes a northbridge request queue 161 and a memory controller 165. The northbridge request queue 161 stores memory access requests received from the northbridge interfaces 122-125. The memory controller 165 accesses the memory access requests stored at the northbridge request queue 161 and interfaces with the memory 180 to satisfy the memory access requests. The memory controller 165 thereby ensures that the memory access requests are provided to the memory 180 in an orderly and efficient fashion, preventing collisions or other traffic hazards. In addition, the memory controller 165 facilitates communication of data, in response to load requests, from the memory 180 to the processor core that generated the load request. Further, the memory controller 165 manages the northbridge request queue 161 to ensure that, one a memory access request has been satisfied by the memory 180, the memory access request is removed from the northbridge request queue 161. A memory access request that is stored at the northbridge request queue 161 and is awaiting satisfaction at the memory 180 is referred to as pending at the northbridge 160. Thus, for example, if a processor core has three memory access requests stored at the northbridge 160 awaiting satisfaction by the memory 180, the processor core is referred to as having three memory access requests pending at the northbridge 160.

The northbridge request queue 161 can only hold a limited number of memory access requests. Accordingly, to allow each of the processor cores 102-105 to have their memory access requests satisfied, the northbridge 160, in conjunction with the northbridge interfaces 122-125, implements a token scheme. As used herein, a token refers to a logical structure representing permission for a northbridge interface to issue a memory access request, on behalf of its corresponding processor core, to the northbridge 160. The northbridge 160 issues tokens to each of the northbridge interfaces 122-125 to limit the corresponding number of memory access requests they can have stored at the northbridge request queue 161. As used herein, a token issued to a given northbridge interface is also referred to as being issued to the corresponding processor core of the northbridge interface.

To manage the issuing of tokens, the northbridge 160 includes a token manager 162. The northbridge interfaces 122-125 each include a token counter (e.g., token counter 158 of northbridge interface 122). In response to a system reset, the token manager issues a specified minimum number of tokens to each of the northbridge interfaces 122-125, which store the specified minimum number at their token counter. The minimum number of tokens is independent of the number of memory access requests pending for a given processor core at the northbridge 160. In some embodiments, the minimum number of tokens is a programmable value that can be individually programmed for each of the processor cores 102-105. In operation, in response to issuing a memory access request to the northbridge 160, the controllers decrement their corresponding token counters and, when the token counter value reaches a threshold value (e.g. zero), suspend provision of additional memory access requests to the northbridge 160 until the token counter value is greater than the threshold value at the assigned token register. In response to receiving from the northbridge 160 an indication that a memory access request has been satisfied, the controller of the northbridge interface that issued the memory access request increments its token counter, indicating that a token has been made available for the issuance of another memory access request. In some embodiments, the threshold that controls suspension of the provision of additional memory access requests is a programmable value.

To further illustrate the token scheme using the example of northbridge interface 122, in response to a reset at the processing system 100 the token manager 162 issues a specified minimum number of tokens to the northbridge interface 122. In some embodiments, the token manager 162 issues the tokens by providing control signaling to the controller 132 indicating the specified minimum number. In response, the controller 132 adjusts the token counter 158 to store the specified number. The controller 132 decrements the token counter 158 in response to issuing a memory access request from the request queue 142 and increments the token counter 158 in response to receiving an indication from the northbridge 160 that one of its memory access requests has been satisfied. When the value at the token counter 158 reaches the threshold value, the controller 132 does not issue any memory access requests to the northbridge 160. The token counter 158 thus governs the maximum number of unsatisfied memory access requests the northbridge interface 122 can have pending at the northbridge 160.

The token manager 162 issues additional tokens to the northbridge interfaces 122-125 based on observed memory access patterns, thereby enhancing communication efficiency for selected patterns. To illustrate, the northbridge 160 includes a reserve token counter 163 that stores a value representing a number of available reserved tokens. In some embodiments, after a reset the token manager sets the value at the reserved token counter 158 such that the sum of the value and the minimum number tokens issued to the northbridge interfaces 122-125 is equal to the total number of slots at the northbridge request queue 161. Thus, for example, if the northbridge request queue 161 has a total number of twenty-five slots to store memory access requests, and each of the northbridge request queues 161 are each initially issued a minimum number of four tokens, the value stored at the reserve token counter 163 after a reset is nine.

The token manager monitors the northbridge request queue to determine the rate at which memory access requests are received from each of the northbridge interfaces 122-125. In response to detecting a high level of memory accesses from one of the northbridge interfaces 122-125, the token manager 162 issues a portion of the reserve tokens to the corresponding northbridge interface. Examples of particular memory access patterns that indicate a high level of memory accesses include a threshold number of memory access requests being received from the northbridge interface in a threshold amount of time, repeated patterns of memory access requests to particular memory addresses, and the like. To issue the reserve tokens, the token manager decrements the reserve token counter 163 by a number representing the number of additional tokens to be issued, and communicates the number of additional tokens to the northbridge interface. In response, the northbridge interface increases the value at its assigned token register to reflect the additional issued tokens.

In response to being issued reserve tokens, the northbridge interfaces 122-125 monitor their communication activity and, in response to determining a low level of memory accesses, determine whether to return some or all of the reserved tokens to the northbridge 160. Detection of a low level of memory accesses can be based on any of a number of memory access patterns, such as the number of memory access requests stored at the request queue falling below a threshold value, the number of memory access requests being received at the request queue in a threshold amount of time falling below a threshold value, and the like. In response to detecting a memory access pattern indicating a low level of memory accesses, the controller returns reserve tokens by reducing the value of the assigned token register 152 to reflect the minimum number of assigned tokens and by notifying the northbridge 160 that the reserve tokens have been returned. In response to the notification, the token manager 162 adjusts the value at the reserved token counter to reflect the return of the reserved tokens.

By issuing reserve tokens based on detected memory access patterns, the northbridge 160 can accommodate particular patterns that would otherwise reduce communication efficiency. To illustrate using an example, the processor core 102 may experience a burst of memory access requests, such that a large number of requests are generated in a short amount of time. If the northbridge 160 were to issue tokens such that each of the northbridge interfaces 122-125 had an equal number of tokens, the northbridge interface 122 may not be able to accommodate the burst of memory access requests. In particular, the northbridge interface would have to buffer, at the request queue 142, memory access requests in excess of its assigned number of tokens, even when other ones of the northbridge interfaces 123-125 have many tokens that are not being used. Because the northbridge 160 can issue reserve tokens based on detecting a burst of memory access requests from the northbridge interface 125, it is able accommodate the detected burst. Because of the relatively large amount of time that memory access requests take to satisfy, thus consuming tokens for a large amount of time, the use of the reserve tokens to accommodate detected bursts improves processing efficiency.

Figure 2:
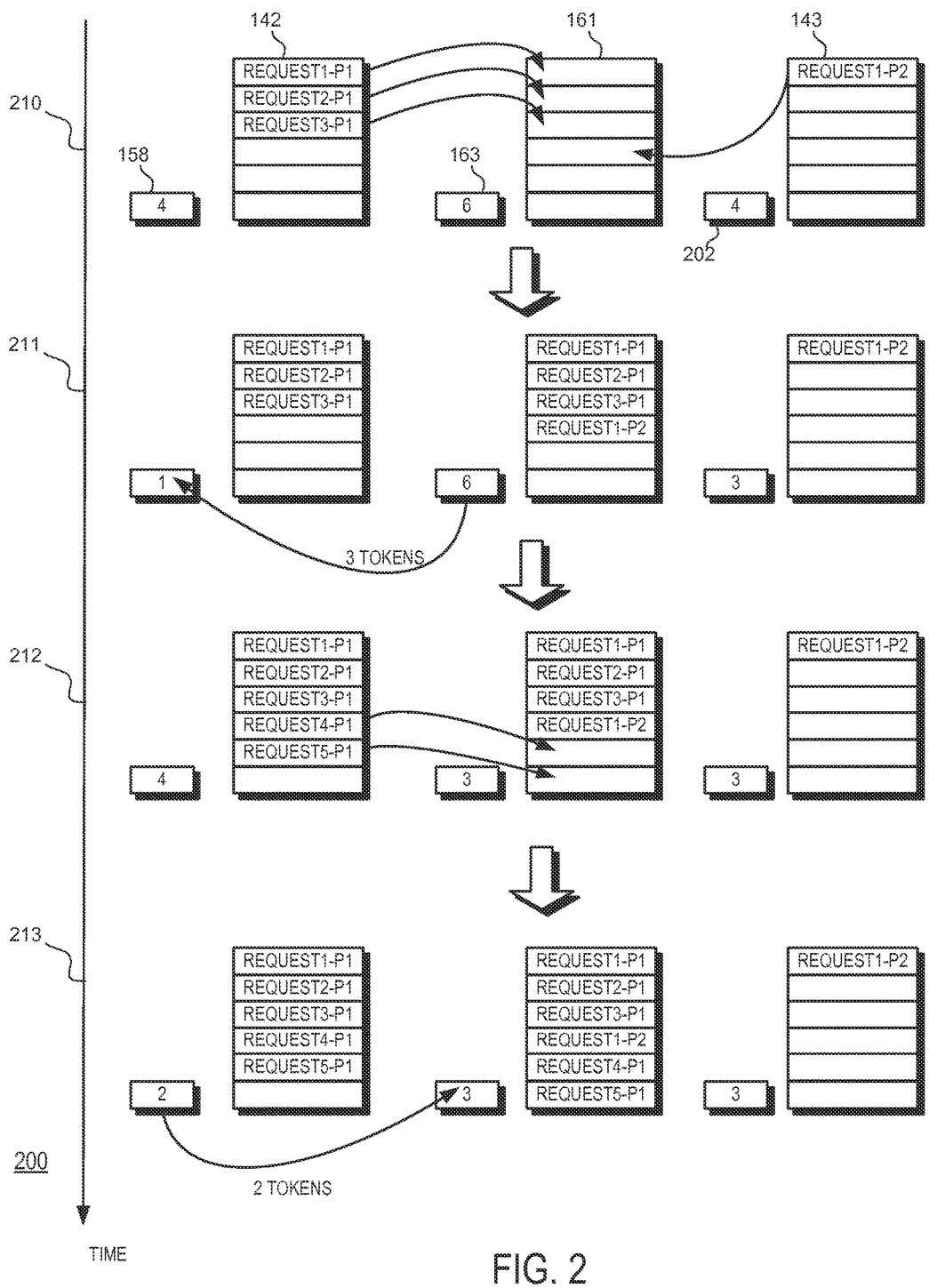
FIG. 2 is a diagram illustrating an example of token management at a northbridge of the processing system of FIG. 1 in accordance with some embodiments.

FIG. 2 illustrates a timeline 200 showing an example operation of the processing system 100 in accordance with some embodiments. The timeline 200 illustrates the contents of a portion of the request queue 142 of the northbridge interface 122, the contents of a portion of a request queue 143 of the northbridge interface 123, the contents of a portion of the northbridge request queue 161, and the contents of the reserve token register 163. The timeline 200 also illustrates the contents of the token register 158 and the contents of a token register 202 for the northbridge interface 123.

Prior to time 210, the processing system 100 has undergone a reset. Accordingly, the value of the reserve token register 163 is set to 6, indicating a total of 6 reserved tokens. In addition, the northbridge 160 issues the minimum number of 4 tokens to each of the northbridge interfaces 122 and 123, as indicated by the token registers 158 and 202. At time 210, the request queue 142 stores three memory access requests and the request queue 143 stores one memory access requests. Accordingly, because the northbridge interfaces 122 and 123 each have enough tokens to accommodate the memory access requests, they issue the requests to the northbridge 160. The number of available tokens for the northbridge interface 122 is thus reduced by three, while the number of available tokens for the northbridge interface 123 is reduced by one, as indicated at time 211.

At time 211, the token manager 162 detects that the northbridge interface 122 has provided three memory access requests within a threshold amount of time (e.g. within 3 clock cycles). The token manager 162 therefore determines that the processor core 102 is experiencing a burst of memory access requests and, in response, issues three reserve tokens to the northbridge interface 122.

At time 212, the northbridge interface 122 has received two additional memory access requests from the processor core 102. Accordingly, the northbridge interface 122 uses two tokens to issue the received memory access requests to the northbridge 160. Thus, in the illustrated example of FIG. 2, the additional reserve tokens issued by the northbridge 160 in response to detecting the burst of memory access requests allows the northbridge interface 122 to issue additional memory access requests. The reserve tokens therefore allow for efficient allocation of the resources of the northbridge 160.

At time 213, the controller 132 determines that the request queue 142 has not received additional memory access requests in a threshold amount of time (e.g. 2 clock cycles), indicating the burst of memory access requests is over. In response, the controller 132 returns 2 of the reserve tokens to the northbridge 160. The controller 132 does not yet return the third reserved token because it is being used for an outstanding memory access request. In some embodiments, the controller 132 returns the last reserved token in response to receiving an indication from the northbridge 160 that one of its pending memory access requests has been satisfied.

Figure 3:
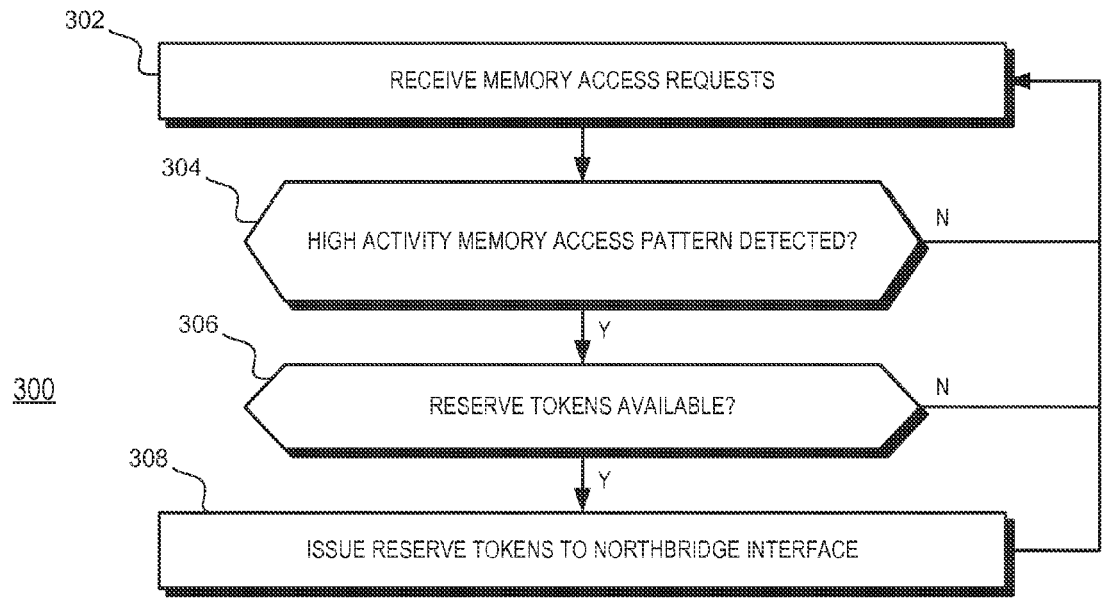
FIG. 3 is a flow diagram of a method of token management at the northbridge of the processing system of FIG. 1 in accordance with some embodiments.

FIG. 3 illustrates a flow diagram of a method 300 of token management at a northbridge in accordance with some embodiments. For purposes of explanation, the method 300 is discussed in the context of an example application at the processing system 100 of FIG. 1. At block 302, the northbridge 160 receives memory access requests from the northbridge interfaces 122-125. At block 304 the token manager 162 detects if the received memory access requests indicate a high activity memory access pattern that demands the issuance of reserve tokens. For example, the token manager 162 can determine a high activity memory access pattern by detecting whether more than a threshold number of memory access requests have been received from a given northbridge interface in a threshold amount of time, by detecting memory accesses from a give northbridge interface to a particular region of memory, and the like. If the token manager 162 does not detect a high activity memory access pattern for one of the northbridge interfaces 122-125, the method flow returns to block 302.

If, at block 304, the token manager 162 detects a high activity memory access pattern, the method flow proceeds to block 306 and the token manager determines if there are reserve tokens available by checking the value at the reserve token counter 163. If the value indicates there are no more reserve tokens available (e.g. the value is zero), the method flow returns to block 302. If the value at the token counter 158 indicates that there are additional reserve tokens available, the method flow moves to block 308 and the token manager 162 issues a specified number of the available reserve tokens to the northbridge interface that is experiencing the high activity memory access pattern. The method flow returns to block 302.

Figure 4:
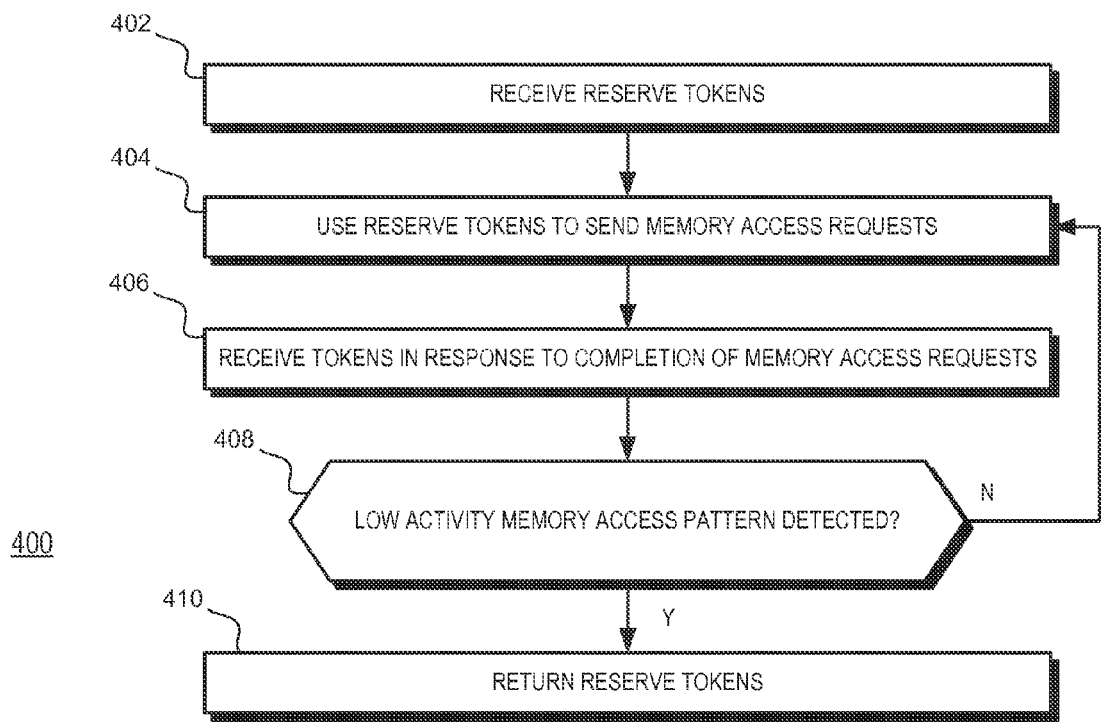
FIG. 4 is flow diagram of a method of returning reserve tokens to the northbridge of the processing system of FIG. 1 in accordance with some embodiments of the present disclosure.

FIG. 4 illustrates a flow diagram of a method 400 of returning reserve tokens to a northbridge in accordance with some embodiments. For purposes of explanation, the method 400 is discussed in the context of an example application at the northbridge interface 122 of FIG. 1. At block 402, the controller 132 receives an indication from the northbridge 160 that the northbridge interface 122 has been issued reserve tokens. In response, the controller 132 adjusts the value stored at the assigned token register 152 to reflect the reserve tokens. At block 404, the controller 132 uses the reserve tokens to issue memory access requests from the request queue 142 and effects commensurate decreases in the value at the token counter 158. At block 406 the controller 132 receives indications from the northbridge 160 that one or more of its previously issued memory access requests have been completed. In response, the controller 132 effects commensurate decreases in the value at the token counter 158. At block 408 the controller 132 determines if a low activity memory access pattern is detected. Such a pattern can be indicated by, for example, the request queue 142 storing less than a threshold number of memory access requests or by determining that the request queue 142 has not received a threshold number of memory access requests (e.g. one memory access request) in a threshold amount of time (e.g. two clock cycles). If a low activity memory access pattern is not detected, the method flow returns to block 404. If a low activity memory access pattern is detected, the controller 132 returns the reserve tokens by reducing the value at the token register 158 and by indicating to the northbridge 160 that the reserve tokens are returned.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processor described above. Further, in some embodiments, the apparatus and techniques described above are implemented in a system comprising one or more integrated circuit (IC) devices (also referred to as integrated circuit packages or microchips), such as the processing system described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 5:
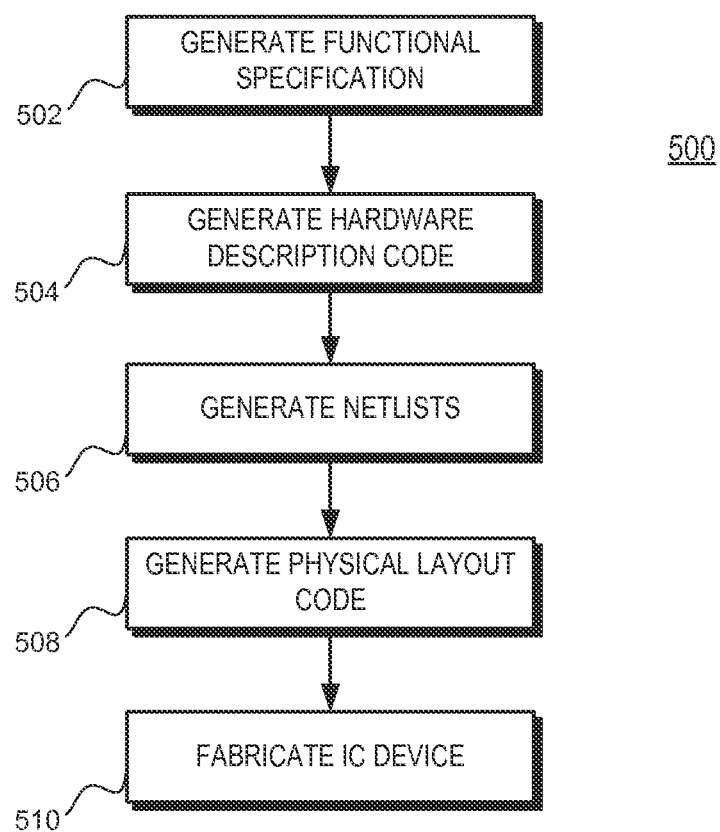
FIG. 5 is a flow diagram illustrating a method for designing and fabricating an integrated circuit device implementing at least a portion of a component of a processing system in accordance with some embodiments.

FIG. 5 is a flow diagram illustrating an example method 500 for the design and fabrication of an IC device implementing one or more aspects disclosed herein. As noted above, the code generated for each of the following processes is stored or otherwise embodied in computer readable storage media for access and use by the corresponding design tool or fabrication tool.

At block 502 a functional specification for the IC device is generated. The functional specification (often referred to as a micro architecture specification (MAS)) may be represented by any of a variety of programming languages or modeling languages, including C, C++, SystemC, Simulink, or MATLAB.

At block 504, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 506 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 508, one or more EDA tools use the netlists produced at block 506 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 510, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method includes dynamically issuing tokens from a northbridge to a first processor core of a processor based on a number of memory access requests generated by the first processor core, the tokens limiting a maximum number of memory access requests that the first processor core can have pending at the northbridge. In some aspects, dynamically issuing the tokens comprises issuing a first number of tokens by: issuing a minimum number of tokens to the first processor core, the minimum number of tokens independent of the number of memory access requests generated by the processor core; and issuing a second number of tokens based on the number of memory access requests generated by the first processor core, the first number of tokens including the minimum number of tokens and the second number of tokens. In some aspects issuing the second number of tokens comprises issuing the second number of tokens in response to the northbridge receiving at least a threshold number of memory access requests from the first processor core. In some aspects issuing the second number of tokens comprises issuing the second number of tokens in response to the northbridge receiving at least the threshold number of memory access requests from the first processor core in not more than a specified amount of time. In some aspects the method includes: after the issuing of the first number of tokens from the northbridge to the first processor core, returning the first number of tokens from the first processor core to the northbridge based on the number of memory access requests generated by the first processor core. In some aspects returning the first number of tokens comprises returning the first number of tokens in response to the first processor core issuing fewer than a threshold number of memory access requests to the northbridge in a threshold amount of time. In some aspects the method includes: after the first number of tokens have been returned from the first processor core to the northbridge, issuing the first number of tokens from the northbridge to a second processor core based on a number of memory access requests generated by the second processor core.

In some embodiments, a method includes: maintaining reserve tokens at a northbridge of a processor; issuing the reserve tokens to a plurality of processor cores of the processor based on corresponding memory access activity at the plurality of processor cores; and limiting a corresponding number of pending memory access requests at the northbridge for each of the plurality of processor cores based on the issued reserve tokens. In some aspects the method includes issuing a minimum number of tokens to each of the plurality of processor cores the minimum number of tokens independent of the reserve tokens. In some aspects the method includes returning the reserve tokens from the processor cores to the northbridge based on memory access activity at the plurality of processor cores. In some aspects issuing the reserve tokens comprises issuing the reserve tokens based on corresponding numbers of memory access requests generated by each of the plurality of processor cores.

In some embodiments a device includes: a plurality of processor cores including a first processor core and a second processor core; and a northbridge to issue a first number of tokens to the first processor core based on a number of memory access requests generated by the first processor core, the tokens limiting a maximum number of memory access requests the first processor core can have pending at the northbridge. In some aspects the northbridge issues a minimum number of tokens to each of the first processor core and the second processor core, the minimum number independent of the number of memory access requests generated by the corresponding processor core. In some aspects the northbridge issues a second number of tokens to the first processor core based on the number of memory access requests generated by the first processor core, the first number of tokens including the minimum number of tokens and the second number of tokens. In some aspects the northbridge issues the second number of tokens in response to the northbridge receiving at least a threshold number of memory access requests from the first processor core. In some aspects the northbridge issues the second number of tokens in response to the northbridge receiving at least the threshold number of memory access requests from the first processor core in a threshold amount of time. In some aspects the device includes an interface to return the first number of tokens to the northbridge based on the number of memory access requests generated by the first processor core. In some aspects the interface is to return the first number of tokens in response to the first processor core issuing fewer than a threshold number of memory access requests to the northbridge in not more than a specified amount of time. In some aspects the northbridge is to issue the first number of tokens to the second processor core based on a number of memory access requests generated by the second processor core.

In some embodiments a tangible computer readable medium stores code to adapt at least one computer system to perform a portion of a process to fabricate at least part of a processor comprising: a plurality of processor cores including a first processor core and a second processor core; and a northbridge comprising to issue a first number of tokens from to the first processor core based on a number of memory access requests generated by the first processor core, the tokens limiting a maximum number of memory access requests the first processor core can have pending at the northbridge. In some aspects the northbridge issues a minimum number of tokens to each of the first processor core and the second processor core, the minimum number independent of the number of memory access requests generated by the corresponding processor core. In some aspects the northbridge issues a second number of tokens to the first processor core based on the number of memory access requests generated by the first processor core, the first number of tokens including the minimum number of tokens and the second number of tokens. In some aspects the northbridge issues the second number of tokens in response to the northbridge receiving at least a threshold number of memory access requests from the first processor core.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   identifying, at a northbridge, a number of memory access requests received at the northbridge from a first processor core of a processor comprising a plurality of processor cores; and
   independent of a first set of tokens assigned to other processor cores of the plurality of processor cores, dynamically issuing tokens from the northbridge to the first processor core in response to the number of memory access requests received at the northbridge from the first processor core exceeding a threshold, the tokens limiting a maximum number of memory access requests that the first processor core can have pending at the northbridge, wherein dynamically issuing the tokens comprises issuing a first number of tokens by:
      issuing a minimum number of tokens to the first processor core, the minimum number of tokens independent of the numbers of memory access requests generated by the processor core; and
      issuing a second number of tokens in response to the number of memory access requests received at the northbridge exceeding the threshold, the first number of tokens including the minimum number of tokens and the second number of tokens, wherein issuing the second number of tokens comprises issuing the second number of tokens in response to the number of memory access requests received at the northbridge exceeding the threshold in not more than a specified amount of time.

2. The method of claim 1, further comprising:
   after the issuing of the first number of tokens from the northbridge to the first processor core, returning the second number of tokens from the first processor core to the northbridge based on the number of memory access requests generated by the first processor core.

3. The method of claim 2, wherein returning the first number of tokens comprises returning the second number of tokens in response to the first processor core issuing fewer than a threshold number of memory access requests to the northbridge in a threshold amount of time.

4. The method of claim 3, further comprising:
   after the second number of tokens have been returned from the first processor core to the northbridge, issuing the second number of tokens from the northbridge to a second processor core based on a number of memory access requests generated by the second processor core.

5. A method, comprising:
   maintaining reserve tokens at a northbridge of a processor;
   identifying at the northbridge, for each of a plurality of processor cores of the processor, a corresponding number of memory access requests received at the northbridge from the processor core;
   independent of a set of tokens assigned to other processor cores of the plurality of processor cores, issuing the reserve tokens to one of the plurality of processor cores of the processor in response to the corresponding number of memory access requests received at the northbridge exceeding a threshold;
   limiting a corresponding number of pending memory access requests at the northbridge for each of the plurality of processor cores based on the issued reserve tokens; and
   returning the reserve tokens from the processor cores to the northbridge based on memory access activity at the plurality of processor cores.

6. The method of claim 5, further comprising issuing a minimum number of tokens to each of the plurality of processor cores, the minimum number of tokens independent of the reserve tokens.

7. The method of claim 5, wherein issuing the reserve tokens comprises issuing the reserve tokens based on corresponding numbers of memory access requests generated by each of the plurality of processor cores.

8. A device, comprising:

a plurality of processor cores including a first processor core and a second processor core; and a northbridge to:
- identify a number of memory access requests received at the northbridge from the first processor core
- issue a minimum number of tokens to each of the first processor core and the second processor core, the minimum number independent of the number of memory access requests generated by the corresponding processor core;
- independent of a set of tokens assigned to the second processor core, issue a first number of tokens to the first processor core in response to the number of memory access requests received at the northbridge from the first processor core exceeding a threshold, wherein the threshold is a programmable value, the tokens limiting a maximum number of memory access requests the first processor core can have pending at the northbridge, and
- issue a second number of tokens to the first processor core in response to the number of memory access requests received at the northbridge from the first processor core exceeding the threshold in a threshold amount of time, the first number of tokens including the minimum number of tokens and the second number of tokens.

9. The device of claim 8, further comprising an interface to return the second number of tokens to the northbridge based on the number of memory access requests generated by the first processor core.

10. The device of claim 9, wherein the interface is to return the second number of tokens in response to the first processor core issuing fewer than a threshold number of memory access requests to the northbridge in not more than a specified amount of time.

11. The device of claim 10, wherein the northbridge is to issue the first number of tokens to the second processor core based on a number of memory access requests generated by the second processor core.

* * * * *